May 31, 1932. C. A. CAMPBELL 1,860,450
DIAPHRAGM ACTUATED VALVE
Filed May 3, 1928
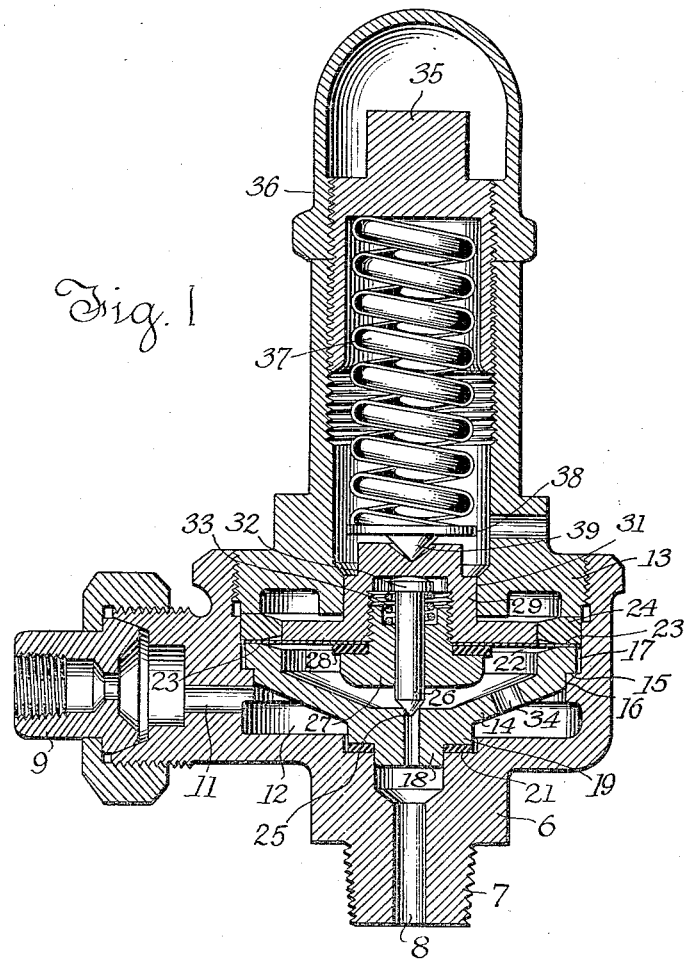
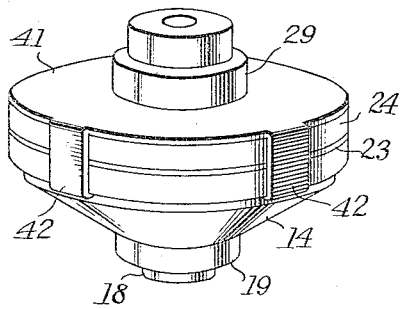
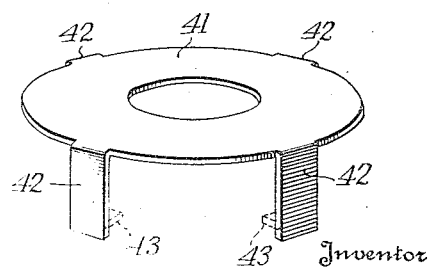
Inventor
Charles A. Campbell
By Dodge
Attorneys Patented May 31, 1932

1,860,450

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

DIAPHRAGM ACTUATED VALVE

Application filed May 3, 1928. Serial No. 274,950.

This invention relates to diaphragm actuated valves, and will be disclosed as applied to a so-called governor top for use with pump governors of air brake systems.

Valves of this general character have been used in other combinations in the air brake art, and essentially similar valves are used in other arts. For example, they have been used as so-called "terminal check valves" for preventing flow of steam from a steam passage in a locomotive to a force feed lubricator connected to feed oil to said steam passage.

Consequently, the invention hereinafter disclosed is intended for general application, although its utility will be discussed primarily from the standpoint of the air brake art.

In such valves as ordinarily constructed the pin valve carried by the diaphragm coacts with a relatively small port in a seat bushing which is pressed to place. The valve and seat are subject to deformation, usually as the result of scale which becomes embedded in the seat. To minimize the presence of rust and scale, the valve bodies of governor tops have commonly been made of brass.

One purpose of the present invention is to permit the body to be made of cast iron, or other relatively inexpensive material, without sacrifice of efficiency.

Another object of the invention is to make the valve seat readily removable so that the housing of the pin valve mechanism need never be dismounted to replace the seat.

Another object of the invention is to permit the diaphragm with its complete mount, including the valve and seat, to be assembled, shipped and replaced as a unit, facilitating replacement of parts and economizing in the cost of repairs.

The features of the invention are illustrated in the accompanying drawings, in which,—

Fig. 1 is a vertical axial section of the preferred embodiment of the invention.

Fig. 2 is a perspective view of the replacement unit, consisting of the diaphragm, diaphragm mount, pin valve, and seat, held in assembled relation by a clip.

Fig. 3 is a perspective view of the clip before application to the assembled unit.

Referring first to Fig. 1, 6 represents the valve body or housing. This may be made of cast iron instead of brass, as has been the prior practice. It is provided at its lower end with a threaded nipple 7, by means of which it is screwed into the pump governor structure. The nipple 7 is formed with the usual port 8. The port 8 forms a communication by which air pressure is admitted to the piston chamber of the usual governor mechanism, as will be well understood. The union 9 offers connection to a pipe leading to the reservoir in which the pump governor acts to maintain a definite pressure. In other words, this pipe conveys the regulating pressure to the governor top, and the pressure thus conveyed passes through the passage 11 to the lower portion 12 of the chamber within the housing 6.

The housing 6 is open at its top, as usual, and is there internally threaded to receive the combined spring box and diaphragm clamping nut 13. A circular cup-like member 14 is mounted within the housing 6 upon a flange 15. This member 14 serves as a combined diaphragm support and valve seat, and is readily removable. To secure ready removal the member 14 is centered by means of a close slip fit at 16, there being peripheral clearance at 17 so that if the member 14 be lifted a short distance it will be entirely free. At its lower end the member 14 is formed with a ported nipple 18 which extends into a countersink in the housing 6. This countersink communicates directly with the passage 8.

Above the nipple 18 is a shoulder 19 which enters a larger and shallower countersink in the body 6 and there seats upon and seals against a gasket 21. The upper margin of the member 14 is beveled inwardly, as shown at 22, and thus serves as a seat for the periphery of the flexible metallic diaphragm 23. Overlying this diaphragm is an inwardly beveled clamping ring 24. This ring is preferably beveled both at the top and bottom so as to be reversible.

The pin valve seat is formed in member 14, as indicated at 25, and the pin valve coacting with this seat is shown at 26. The pin valve is slidably mounted in a nut 27. This passes through a hole at the center of the diaphragm 23, a tight joint being effected by a washer 28. The nut 27 is threaded into the center of a thrust member 29 which has an annular portion seating on the upper face of the diaphragm 23 and which is guided at 31 in the spring box member 13. The member 29 thus serves not only to transmit a loading thrust to the diaphragm, but also serves as a directing member which assures accurate seating of the pin valve 26 on its seat 25.

The pin valve is constructed in the usual manner, that is, it has an enlarged head 32 which is urged upward by a coil spring 33 surrounding the stem portion of the valve. Pressure fluid entering the body 6 by way of the passage 11, flows first beneath the cup-shaped member 14 and then through a passage 34 formed through the member 14, to the space beneath the member 14 and the lower face of the diaphragm 23. The passage 34 is preferably located on the side remote from the passage 11, though this is not strictly necessary. The effect is to isolate, in an effective degree, the pin valve 26 and its seat 25, from the interior wall of the housing 6. Thus rust and scale are dropped in the chamber 12 beneath the member 14, and even though the housing 6 be of cast iron, or other corrodible metal, no serious trouble from scale is encountered. With the conventional pin valve structure the use of a cast iron body has been demonstrated to be unsatisfactory.

Threaded into the upper end of the member 13 is an adjustable spring seat 35, which, as usual, is locked in place by a combined cap and check nut 36 threaded on to the member 35 and entering into thrust engagement with the member 13. A loading spring 37 reacts upward against the member 35 and downward against a bearer member 38 which has a conical pin 39 seated in a conical recess formed in the upper portion of the member 29 to receive it. This conical recess has a somewhat wider angle so as to permit at least moderate universal angular motion of the member 39.

In prior structures, if the pin valve seat became damaged, it was necessary to remove the entire governor top. This was for the reason that the pin valve seat was pressed to place and could not be satisfactorily replaced or refinished otherwise. In the present construction this difficulty is not encountered. To make a repair, cap 36, spring seat 35, and the spring 37, are removed. Then the spring box member 13 is removed, whereupon it becomes possible to lift out the clamping ring 24, the diaphragm 23 with the attached valve, and the combined diaphragm support and pin valve seat 14. These units are made on an interchangeable basis and may be individually replaced, but it is preferred, in order to secure absolutely perfect centering of the pin valve relatively to its seat, to replace all the units above mentioned by a set of units properly coordinated with each other and tested at the factory for accuracy. This is accomplished by assembling these units by means of a clip which remains upon the units until they are to be inserted into the housing 6.

This clip is best shown in Figs. 2 and 3, and consists of a metallic annulus 41 having a plurality of bendable fingers 42 which extend perpendicularly to the plane of the annular member 41 of the clip. The annular portion 41 surrounds the upward extending boss 29 of the thrust member and overlies this member and the clamping ring 24. The extreme ends of the fingers 42 are bent in, as shown in Fig. 2, and as indicated in dotted lines at 43 in Fig. 3 to engage the seating rim of the member 14. The clip holds a carefully fitted set of replaceable elements in assembled relation in the housing 6. The damaged parts, which have been removed, are returned to the factory to be reconditioned.

It will be observed that this reconditioning does not affect the ouside dimensions of the assembled unit, shown in Fig. 3. Consequently, while strict interchangeability of the complete unit is maintained, each valve may be reconditioned with reference to its particular seat without maintaining strict interchangeability of the valves per se. The effect is to secure the economy in reconditioning material that is secured at present, without requiring dismounting of the entire governor top, and without requiring the breaking of any pipe joints.

What is claimed is,—

In a device of the class described, the combination of a body having an inlet passage, a discharge passage, and an annular shoulder above said passages; a gasket surrounding said discharge passage; a combined valve seat and diaphragm support sustained on said shoulder in sealing relation with said gasket, there being a ported valve seat in the upper face of the support leading to the discharge port in the body and another passage in said support through which fluid may pass from the inlet port to the space above said support; a diaphragm mounted on said support; a valve arranged to be actuated by said diaphragm and to coact with said seat; releasable means for clamping said diaphragm against said support; and loading means carried thereby and urging said valve in a closing direction.

In testimony whereof I have signed my name to this specification.

CHARLES A. CAMPBELL.